April 12, 1966     F. W. KANTOR     3,246,166
CONTROL CIRCUITS INVOLVING NEGATIVE RESISTANCE DEVICES
Filed Oct. 17, 1961     4 Sheets-Sheet 1

Frederick W. Kantor
INVENTOR.

April 12, 1966 F. W. KANTOR 3,246,166
CONTROL CIRCUITS INVOLVING NEGATIVE RESISTANCE DEVICES
Filed Oct. 17, 1961 4 Sheets-Sheet 2

Frederick W. Kantor
INVENTOR.

April 12, 1966   F. W. KANTOR   3,246,166
CONTROL CIRCUITS INVOLVING NEGATIVE RESISTANCE DEVICES
Filed Oct. 17, 1961   4 Sheets-Sheet 3

Frederick W. Kantor
INVENTOR.

BY Clarence A. O'Brien
and Harvey B. Jacobson
Attorneys

April 12, 1966  F. W. KANTOR  3,246,166
CONTROL CIRCUITS INVOLVING NEGATIVE RESISTANCE DEVICES
Filed Oct. 17, 1961  4 Sheets-Sheet 4

Frederick W. Kantor
INVENTOR.

BY Clarence A. O'Brien
and Harvey B. Jacobson
Attorneys

United States Patent Office 3,246,166
Patented Apr. 12, 1966

3,246,166
CONTROL CIRCUITS INVOLVING NEGATIVE RESISTANCE DEVICES
Frederick W. Kantor, Silver Spring, Md., assignor to Integrated Research & Technology, Inc., Bellerose, N.Y., a corporation of New York
Filed Oct. 17, 1961, Ser. No. 145,681
6 Claims. (Cl. 307—88.5)

This invention relates generally to circuits utilizing current control devices which exhibit negative conductance characteristics under certain conditions. More particularly, the present invention is concerned with the utilization of the positive resistance states of a current controlling device which are separated by a negative resistance state of the device for signal gating and data storage purposes.

Current controlling devices of the type with which the present invention is concerned, include such devices as tunnel diodes, secondary emission devices, and other devices which utilize the tunneling effects through thin insulating films between superconductors. It will therefore be appreciated, that the principles of the present invention while described with respect to tunnel diodes, which make use of the quantum mechanical tunneling phenomenon to attain a negative conductance state, are also applicable to other current controlling devices which provide similar control over the flow of current in a circuit.

The negative resistance region of the forward static characteristic curves of tunnel diodes have heretofore been fairly well exploited. Also, tunnel diodes have been used for switching purposes by rendering the negative resistance state thereof unstable and applying a proper bias to the tunnel diode in order to force the diode into one of two stable states corresponding to two different voltages. The D.C. voltage drop across the diode when either in its stable low voltage state or its stable high voltage state, has been utilized to control the flow of current by connecting both the input and the output to the same electrode of the tunnel diode. The tunnel diode so loaded, will also be loaded during the negative conductance state when switched by a gating pulse between the low and high voltage state. Previous arrangements therefore decreased the switching speed which is otherwise very rapid for tunnel diodes since any load has a finite capacitance so that the change in voltage is occasioned by the elapse of a finite amount of time. Therefore, one of the important objects of the present invention is to utilize the tunnel diode in a circuit arrangement wherein it is not loaded during switching so as to better utilize its rapid switching property.

In utilizing tunnel diodes for data storage and readout purposes, the ability of the diode to rapidly switch from one stable state to the other enables it to perform the desired functions by the corresponding change in voltage associated with the two stable states. Another important object of the present invention therefore, is to provide a circuit arrangement wherein the A.C. signal impedances rather than the D.C. impedances of the tunnel diode respectively associated with the two stable positive impedance states may be utilized to both increase the switching speed and to identify the state it is in without the need for changing that state as heretofore done and which involved a finite loss of time.

A further object of the present invention is to provide a novel gating circuit utilizing the tunnel diode in accordance with the principles of the present invention which gating circuit may provide its own discrimination without use of additional discriminators and which gating circuit may also be utilized for pulse directing and switching purposes.

An additional object of this invention is to provide a novel voltage divider circuit for the tunnel diode for utilizing the change in impedance between the two stable states of the diode, more directly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7:
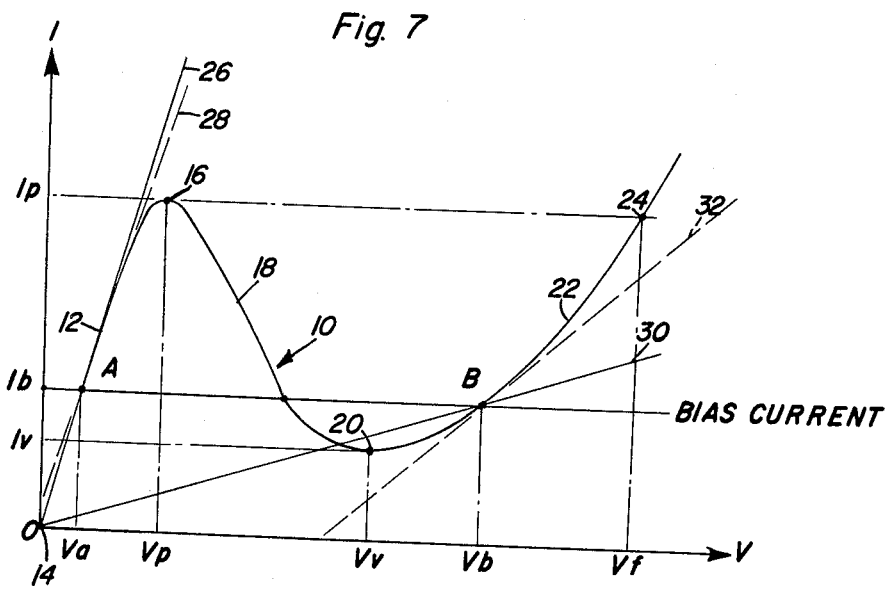
FIGURE 7 is a graphical illustration of a typical forward static characteristic of a tunnel diode.

Referring now to the drawings in detail, the voltage-current characteristic of a germanium tunnel diode is depicted as for example specification number 1N2939 which are devices designed primarily for low level switching and small signal applicaton and having a closely controlled peak point current, good temperature stability and extreme resistance to nuclear radiation. Referring therefore to FIGURE 7 in particular, it will be observed that the illustrated forward static characteristic curve for the tunnel diode generally referred to by reference numeral 10 includes a low impedance, low voltage region 12 defined between the origin 14 and the peak point 16 on the curve wherein the voltage varies between zero and $V_p$. The low impedance, low voltage region 12 is therefore disposed on one side of the negative resistance region 18 of the curve 10 defined between the peak point 16 and the valley point 20. The high impedance, high voltage region 22 of the curve 10 is finally defined between the valley point 20 and the forward point 24. As is well known to those skilled in the art, the tunnel diode will be rendered unstable in its negative resistance region 18 when the biased electrode thereof is loaded by resistance which exceeds the negative resistance of the diode in its negative conductance state. Under such conditions, the application of a bias current $I_b$ will force the diode into either its low voltage state or its high voltage state if the bias current $I_b$ exceeds the valley current $I_v$. Accordingly, when the diode is in its low voltage state, at a given bias current $I_b$, it will exhibit a voltage drop thereacross $V_a$ and have a D.C. resistance corresponding to the D.C. conductance line 26 which is drawn from the origin 14 through the intersection of the bias current line with the characteristic curve at point A. The tangent line 28 at the point A on the curve, therefore corresponds the small A.C. impedance of the tunnel diode under the foregoing stated condition. In order to switch the diode from its low voltage state to the high voltage state indicated by region 22 on the curve, it will be necessary to apply a gating signal pulse current $I_g$ such that the sum of the bias current $I_b$ and the gating pulse current $I_g$ exceeds the peak point current $I_p$. After removal of the gating pulse current, the diode will then settle into a state as indicated by point B on the curve in which case the voltage drop thereacross will now be at a higher value $V_b$. The D.C. resistance of the tunnel diode in its high voltage state will therefore correspond to the D.C. conductance line 30 drawn from the origin 14 through the point B on the curve. In order to switch the diode back to the low voltage state, it will be apparent that a negative gating pulse current must be applied so that the sum of the bias current $I_b$ and the negative gating pulse current minus $I_g$ will be less than the valley point current $I_v$. The tangent line 32 at the point B on the curve corresponding to the signal impedance of the tunnel diode in the high voltage state, will be quite different from the D.C. line 30. It will also be observed that the slope of the line 32 and the corresponding value of the signal impedance may be considerably varied by the selection of the bias current value. It will also be observed that the signal impedance value associated with the line 32 will be different from the signal impedance value associated with the line 28 so that there will be a predetermined signal impedance difference or ratio for any given biasing current $I_b$. The circuit applications of the tunnel diode to be explained in detail hereafter, take advantage of the aforementioned impedance ratio of the positive stable state of the tunnel diode that is associated with any predetermined bias current.

Figure 1:
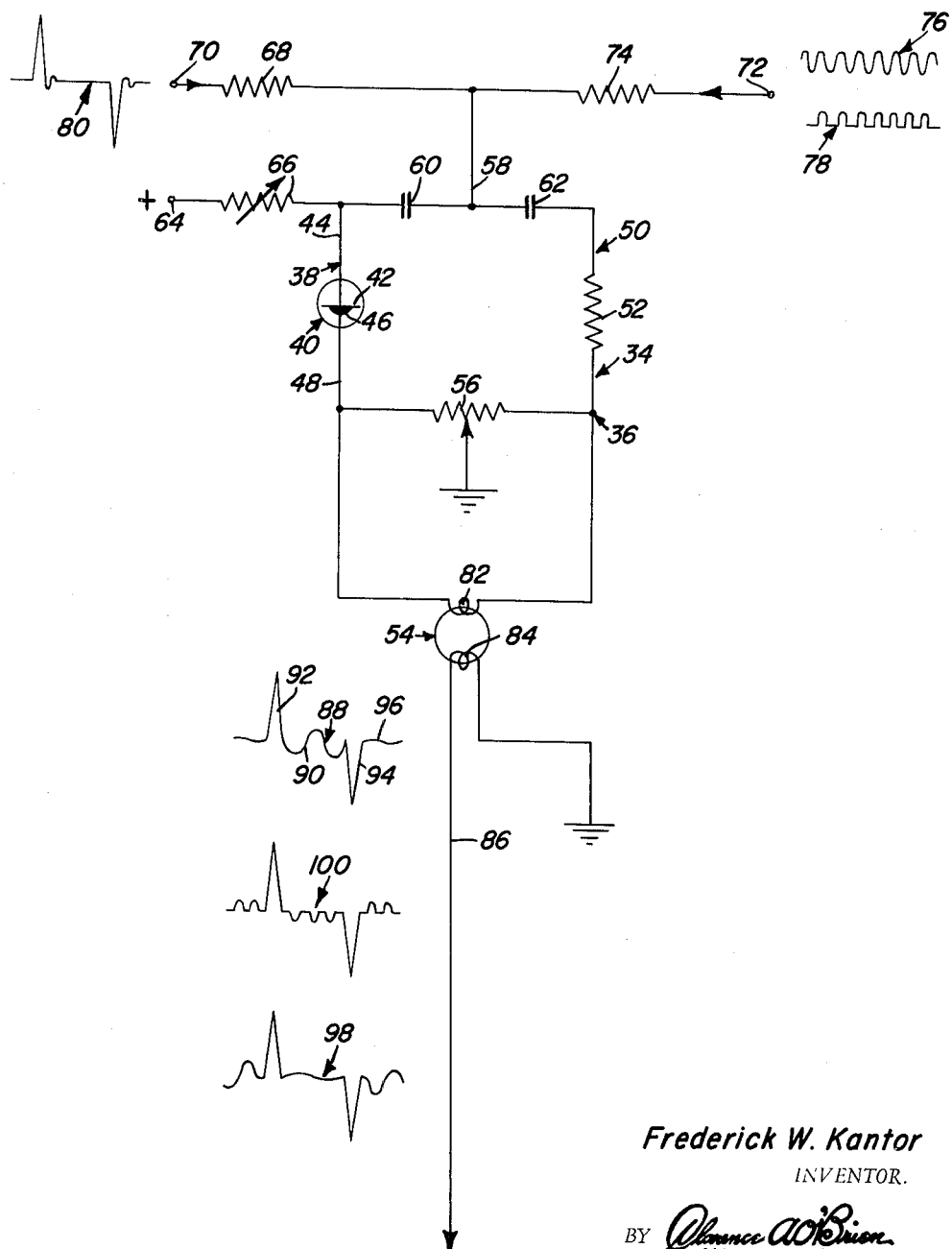
FIGURE 1 is a circuit diagram constituting a test circuit for one type of gating control utilizing a tunnel diode.

Heretofore, the change in the voltage drop across the tunnel diode resulting from switching thereof between its positive stable states has been utilized by connecting both the input and the load to the same electrode of the diode for logic circuit purposes. The voltage state of the diode was thereby effective to control the current available for the load. This arrangement, however, increased the short switching time of the diode since the switching time is effected by the amount of charge available from the trigger pulse of the gating signal and loading of the tunnel diode. By application of the principles of the present invention, not only is the aforementioned reduction in the switching speed avoided but the impedance ratio characteristics of the positive resistance regions of the tunnel diode curve, are taken advantage of. Referring therefore to FIGURE 1 in particular, a test circuit generally referred to by reference numerals 34 is illustrated by means of which the tunnel diode attribute to be utilized as hereinbefore described, was observed and adjustments made for application of said attributes for gating circuit purposes. The circuit 34 therefore includes an A.C. bridge portion generally referred to by reference numeral 36 which includes a branch 38 containing the tunnel diode 40 or for that matter any other suitable negative resistance device. The device 40 therefore includes the positive electrode 42 connected to the conductor 44 of the branch 38 and a negative electrode 46 connected to the conductor 48 of the branch 38. The device 40 utilized was a germanium tunnel diode 1N2939 as hereinbefore indicated. The other branch 50 of the A.C. bridge 36 included a 220 ohm balance resistor 52, both branches 38 and 50 being connected to an output device generally referred to by reference numeral 54. Connected between the branches 38 and 50, is a grounding potentiometer type balancing resistor 56 having a maximum resistance of 250 ohms. The input to the bridge circuit 36 is supplied by the conductor 58 through isolation capacitors 60 and 62 of 100 micro-microfarads. The capacitor 60 is provided so as to block the input current supplied to the branch 38 from the biasing current supplied thereto from a bias supply at terminal 64 which is controlled by an adjustable bias resistor 66. The capacitor 62 is therefore provided for bridge circuit symmetry purposes. Connected to the input line 58 through a 2K ohm isolation resistor 68 is a gating signal supply connected to the terminal 70 which gating signal is also separated from a clock input supply connected to the terminal 72 which is associated with the isolation resistor 74. For test purposes, a clock signal having a sinusoidal wave form 76 was applied to the terminal 72 having a peak to peak amplitude of one-tenth of a volt and a 300 megacycle frequency characteristic. Alternatively, a unidirectional pulse wave input 78 was applied to the terminal 72. Gating pulse signals as indicated by reference numeral 80 were applied to the terminal 70 wherein the pulses had an amplitude of plus or minus two volts and were of one nanosecond duration. The output 54 of the test circuit, was in the form of a toroidal transformer including a primary 82 and a secondary 84 having a one to one winding ratio. The output line 86 was therefore utilized to detect the output wave form produced when a clock input signal 76 or 78 was applied to the terminal 72 and positive and negative gating pulses applied to the terminal 70. Also, the biasing current was adjusted by means of the resistor 66 so that it exceeded the valley current associated with the device 40. Also, the biasing current was selected so as to obtain an impedance ratio of approximately 5 to 1, it being observed that impedance ratios in excess thereof produced instability.

The test circuit 34 as hereinbefore described was then adjusted by means of the balancing resistor device 56 so as to obtain balance when the device 40 was in the low voltage, low impedance state. With a clock signal 76 being applied to the terminal 72 and gating pulses 80 applied to the terminal 70, an output wave form 88 appeared in the line 86. The curve 88 resulted from the fact that the positive gating pulses caused switching of the diode 40 to the high impedance, high voltage state in which the bridge circuits 36 were unbalanced so as to provide an output signal portion 90 of sinusoidal form corresponding to the sinusoidal wave form of the input signal 76. The sinusoidal output portion 90 of course followed the gating pulse portion 92 which was also transmitted to the output. The following negative gating pulse portion 94 in the output signal corresponded to the switching of the tunnel diode 40 to its low impedance, low voltage state in which the bridge circuit 36 would balance by the balancing resistor 56 so that the following output wave portion 96 depicted a substantially zero output, leakage current accounting for the slight variation from the zero output line. When the balancing resistor 56 was adjusted so as to balance the bridge circuit 36 with respect to the high voltage, high impedance state of the diode 40, the output wave form 98 was produced wherein substantially no output occurs between the positive gating pulse and negative gating pulse portion of the curve. It will also become apparent, that by proper selection of the polarity of the gating pulses the clock input wave form may be inverted when transmitted by the bridge circuit in its unbalanced condition. The balancing resistor 56 was therefore adjusted between the two different balancing positions previously described whereby bridge circuit 34 was unbalanced in opposite directions by switching of the diode 40 between its two stable states. For this reason, the unidirectional pulse input 78 was applied to the terminal 72 in order to better observe the inversion effect of the gating circuit on the input. Accordingly, the output wave form 100 was obtained under the aforementioned conditions so that the positive gating pulse portion in switching the device 40 to its high impedance state produced unbalance in the bridge circuit in such a direction as to invert the clock input signal whereas switching of the device 40 back to its low impedance state by a negative gating pulse was operative to unbalance the bridge circuit in the other direction so as to transmit a noninverted input signal.

Figure 2:
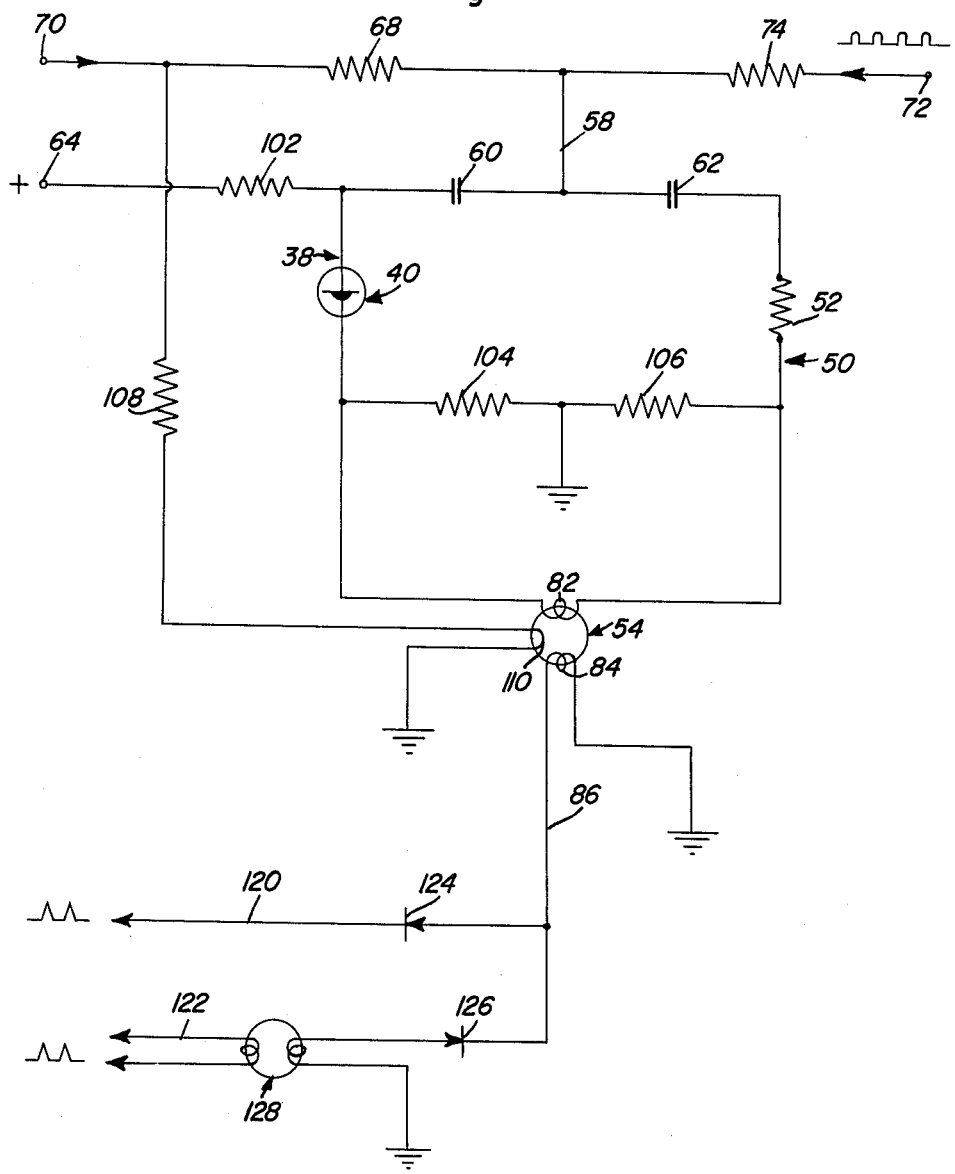
FIGURE 2 is a circuit diagram of a gating circuit based upon the test circuit of FIGURE 1.

Referring now to FIGURE 2 in particular, it will be observed that the gating circuit disclosed therein is the same as the test circuit disclosed in FIGURE 1 except that the resistor 102 replaces the variable resistor 66 and is of a value obtained through adjustment of the resistor 66 in the test circuit 34. Also, the setting of the balancing resistor 56 when adjusted for obtaining directionally opposite unbalance for both positive states of the tunnel diode 40, is replaced by fixed balancing resistors 104 and 106. The circuit of FIGURE 2, however, introduces a modification of the test circuit of FIGURE 1 for the purpose of removing the gating pulse influence on the output signal by connecting the gating input through resistor 108 to the toroidal output transformer by means of winding 110. The gating pulse current is thereby effective to cancel the gating pulse portion from the output signal. The circuit of FIGURE 2 may thereby be utilized for gating control purposes.

Figure 3:
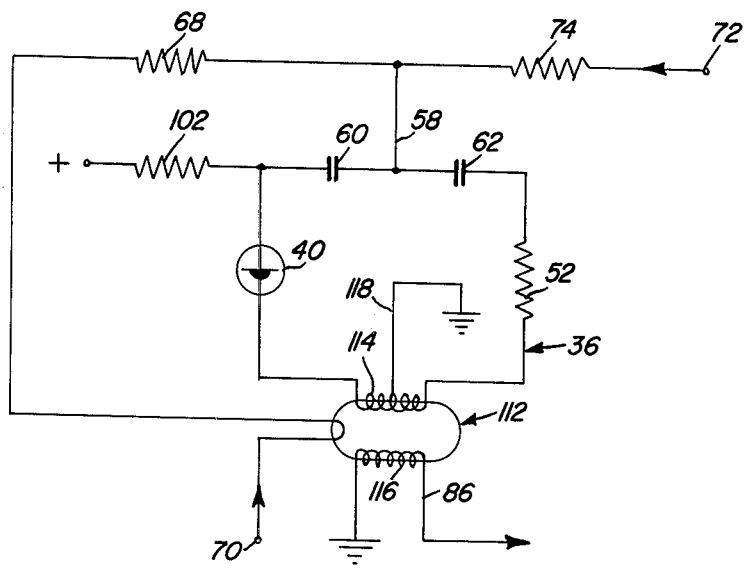
FIGURE 3 is another form of gating circuit based upon the test circuit of FIGURE 1.

The gating circuit of FIGURE 3 represents an alterative method for removal of the gating pulse from the output of the circuit. The gating circuit of FIGURE 3 is therefore similar to that of FIGURE 2 except an output transformer 112 is utilized wherein the primary 114 and secondary 116 are still at a one to one winding ratio but have a larger number of winding turns. The primary winding 114 of the transformer 112 is provided with a grounded center tap 118 by means of which the bridge circuit 36 may be balanced with respect to one of the stable states of the tunnel diode 40. This arrangement therefore permits the connection of gate input from terminal 70 through the output transformer 112 so that the flux produced thereby may cancel the flux produced by a gating pulse in the primary 114 of the output transformer 112 after the input signal has been transmitted through the diode 40.

Figure 4:
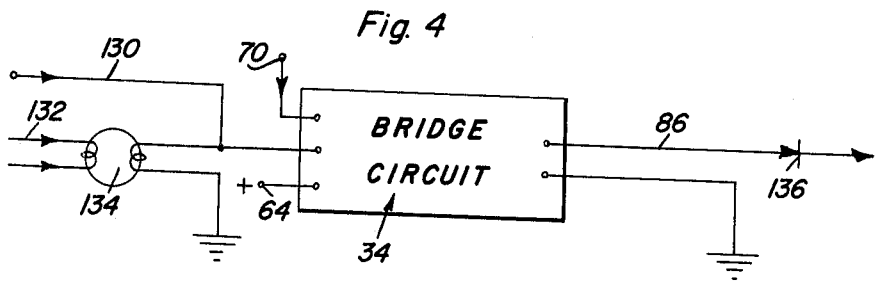
FIGURE 4 is a circuit diagram illustrating one application of the gating circuit of FIGURES 1, 2 and 3.

It will be appreciated from the foregoing description of the gating control circuit of FIGURES 1, 2 and 3 that an input may be utilized for both switching and pulse directing purposes. The output line 86 may accordingly be connected to an output line 120 and output 122 as illustrated in FIGURE 2 for example. The output line 120 is connected to the line 86 through a positive signal conducting diode 124 while the output 122 is connected to the line 86 through a negative signal conducting diode 126 and a signal inverting device 128. Accordingly, depending upon the polarity of the gating pulse supplied to the terminal 70, an uninverted signal will appear either in line 120 or line 122. Accordingly, the gating circuit described will be useful to control the polarity relationship between the clock inputs and clock outputs and also for pulse direction purposes. FIGURE 4 illustrates another application for the bridge circuit type of gating circuit hereinbefore described wherein the bridge circuit may be adjusted for a balance condition with respect to one of the stable states of the tunnel diode. A plurality of inputs may be connected to the bridge circuit 34 as for example input lines 130 and 132. One of the inputs 132 may be inverted by means of a pulse inverting device 134 and mixed with the signal from the input 130 before being supplied to the gating bridge circuit. Therefore, dependent upon the polarity of the gating pulse supplied to the circuit through the gating pulse input terminal 70, the signal may be inverted or not inverted when supplied to the output line 86. The output line is, however, connected to a load through a diode 136 which passes only signals of a single polarity. Accordingly, the gating circuit will be operative as a selector.

From the foregoing description of the bridge type gating circuit, it will be apparent that several advantages are obtained. Firstly, the gating circuit may be utilized as a discriminator, or for pulse direction purposes as respectively described in connection with FIGURES 4 and 2. The latter functions are accomplished with simplified circuitry. Secondly, in view of the fact that the negative resistance device is not loaded, i.e. it does not deliver energy, the maximum switching speed of the negative resistance device is available undiminished. This is particularly significant where minimal triggering pulses for switching are available and an accurate gate is required to operate from sloppy input pulses. Also, amplitude discrimination is inherent in the switching behavior of the negative resistance device so that these circuits act as amplitude discriminators with respect to their gating pulses.

Figure 5:
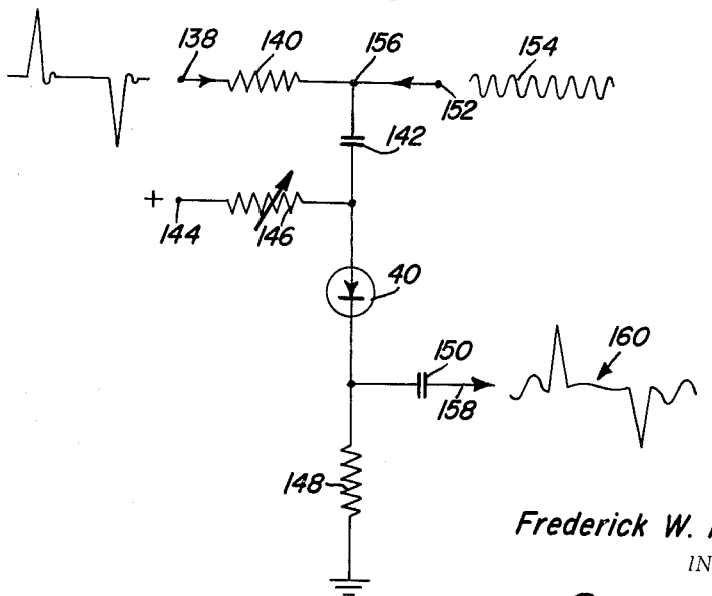
FIGURE 5 is a circuit diagram of a second form of test circuit different from that illustrated in FIGURE 1.

Referring now to FIGURE 5, another form of test circuit is illustrated which utilizes the change in impedance effected by switching of the tunnel diode, directly without a bridge configuration. The gating input terminal 138 is therefore connected through resistor 140 for signal source separation purposes to the negative resistance device 40 also through a D.C. blocking capacitor 142 of 100 micro-microfarads. The biasing supply at terminal 144 supplies biasing current through the adjustable resistor 146 to the device 40. The output is connected to the negative electrode of the device 40 and includes a voltage dividing resistor 148 and an energy storing capacitor 150 in parallel therewith. The clock input signal is therefore applied to the terminal 152 and for test purposes was of a sinusoidal form 154 having a .10 volt peak to peak amplitude. The bias current adjusting resistor 146 was then adjusted so as to obtain an impedance ratio of better than three to one. Gating signals of one volt amplitude were then applied to the input terminals 156. With the voltage dividing resistor 148 of 200 ohms, no output (except for leakage current) appeared in line 158 when a positive gating pulse switched the tunnel diode device 40 to its high voltage state as indicated by the output wave form 160. This of course was accomplished more directly by the test circuit of FIGURE 5 by virtue of the change in the impedance of the negative resistance device 40 after switching thereof by a positive gating pulse.

Figure 6:
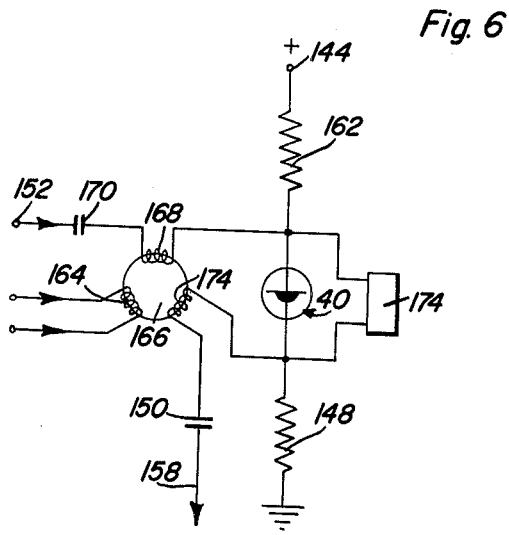
FIGURE 6 is a circuit diagram of a gating circuit based upon the test circuit of FIGURE 5.

The data obtained by the test circuit of FIGURE 5 was therefore applied to the gating circuit of FIGURE 6 wherein the positive electrode of the negative resistance device 40 (also a tunnel diode No. 1N2939) is connected to the bias supply terminal 144 through a biasing resistor 162 of a value obtained by the adjustment of the adjustable resistor 146 in the test circuit of FIGURE 5. The negative electrode of the device 40 is therefore also connected to the voltage dividing resistor 148. However, in the circuit of FIGURE 6, the gating input signal is supplied through a winding 164 and a coupling toroid transformer 166 to the positive electrode of the negative resistance device 40 connected to the transformer 166 by the transformer winding 168. The clock input at terminal 152 is therefore connected to the winding 168 through which the gating pulses are introduced by means of the D.C. blocking capacitor 170. By use of the inductive coupling 166 for introducing the gating signal pulses, the gating pulse in the output wave form may be reduced by connecting the negative electrode of the device 40 to the output line 158 through winding 172 in the transformer device 166. The circuit of FIGURE 6 may thereby be utilized by gating purposes and like the bridge circuits hereinbefore described may act as a discriminator for its gating pulses. However, the rise time or switching speed for the gating circuit of FIGURE 6 will be even better inasmuch as no loading at all exists on the tunnel diode 40 during switching. The circuit of FIGURE 6 is therefore particularly useful as a memory device with an extremely fast readout. The readout consists of measuring the impedance of the tunnel diode 40 by a device 174 at a speed limited only by the rate of propagation of the signal along the wires connecting the device 174 to the electrodes of the tunnel diode 40. Furthermore, since the readout is non-destructive, there is no cycle time involved nor loss of information that would otherwise have to be restored. It will also be apparent that the gating circuit of FIGURE 6 will be useful for readout purposes by virtue of the variations in impedance without requiring switching for readout purposes.

From the foregoing description, application of the principles of the present invention will be apparent. Many applications of the described circuits will therefore become apparent to those skilled in the art as for example in computer circuits. For example, tunnel diodes heretofore operated in a chain for counting purposes were usually switched from a low impedance state to a high impedance state. An increasing impedance accordingly resulted heretofore as a signal proceeded through a chain of tunnel diodes which limited the length of the chain. Considerably longer chains of tunnnel diodes arranged in accordance with the principles of the present invention may therefore be possible since they may be started in a high impedance state and switched to a low impedance state under control of the gating input. Thus, the circuits of the present invention are able to advantageously apply the phenomenon characteristic of tunnel diodes in that the small signal impedances of the tunnel diode in its two stable states can be made significantly different from each other for current controlling purposes. This same mode of operation should be feasible with respect to other negative resistance devices which exhibit the same type of characteristics.

The foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a current controlling device capable of being switched through an unstable conductance state between stable conductance states having different A.C. signal impedances, biasing means for forcing said device into one of said stable states at a predetermined signal impedance ratio between the different A.C. signal impedances associated with said stable states, and circuit means adjusted in accordance with said impedance ratio for rendering the device operative to identify the stable state thereof without switching, said circuit means comprising, input means providing a continuous supply of energy, gating means for providing control pulses, output means, a bridge circuit electrically connecting said input means and said gating means to the output means for delivery of energy under control of said control pulses, said bridge circuit having one branch including said device and bridge balancing means.

2. The combination of claim 1, wherein said bridge balancing means is adjusted operative to balance said bridge circuit only when the device is between the stable states thereof for passing different signals from the input means to the output means in response to control pulses from the gating means switching the device from one stable state to the other.

3. The combination of claim 2, wherein said input means includes plural inputs of different polarity, and said output means includes means for passing signals of one polarity whereby said bridge circuit is operative as a signal selector.

4. In combination with a current controlling device capable of being switched through an unstable negative conductance state between stable positive conductance states having different A.C. signal impedances, biasing means for forcing said device into one of said stable states at a predetermined signal impedance ratio between the different A.C. signal impedances associated with said stable states, and circuit means for rendering the device conductive in said stable states to pass different signals in accordance with said predetermined impedance ratio identifying the stable state in which the device is conductive, said circuit means comprising input means for supply of energy, gating means for providing control pulses, output means, a bridge circuit electrically connecting said input means and said gating means to the output means for controlling the delivery of said energy, said bridge circuit having one branch including said device and bridge balancing means adjusted to unbalance the bridge circuit in opposite directions when switched between the stable states of said device by said control pulses for passing inverted signals from the input means to the output means in one stable state and non-inverted signals in the other stable state, said output means including means for separately and alternatively directing signals of opposite polarity in accordance with the control pulses from the gating means.

5. In a circuit system, a bridge circuit having two branches, input means connected to said bridge circuit for supply of signal voltage thereto, output means connected to said bridge circuit for delivering A.C. voltage to a load, a diode connected in one of said two branches having two stable conductive states, biasing means connected to said one branch for establishing a potential operative to produce two different A.C. impedance values for the diode in the two stable states respectively, means connected between the branches of the bridge circuit for balancing thereof with respect to an impedance value of the diode between said two different A.C. impedance values, and gating means connected to the input means for applying a gating pulse to the bridge circuit switching the diode from one stable state to the other, said diode having an unstable negative conductance condition during switching between said stable states whereby substantially no electrical energy is transferred therethrough when switching.

6. The combination of claim 5 including means electrically coupling the gating means to the output means for cancelling the effect of the gating pulse on the voltage delivered by the output means to the load.

References Cited by the Examiner

UNITED STATES PATENTS

| 3,075,088 | 1/1963 | Li | 307—88.5 |
| 3,105,957 | 10/1963 | Li | 307—88.5 X |
| 3,119,985 | 1/1964 | Kaufman | 307—88.5 X |
| 3,120,653 | 2/1964 | Miller et al. | 307—88.5 X |

OTHER REFERENCES

Electronics, "Tunnel Diode Logic Circuits," by W. F. Chow, June 24, 1960 (page 104, FIG. 2(D) relied upon).

ARTHUR GAUSS, *Primary Examiner.*

JOHN W. HUCKERT, *Examiner.*